United States Patent Office 3,848,002
Patented Nov. 12, 1974

3,848,002
PROCESS FOR THE PRODUCTION OF
P-NITROPHENOLS
Jon Weis and Bjarne Skinhøj Pedersen, Harboør, Denmark, assignors to A/S Cheminova, Lemvig, Denmark
No Drawing. Filed Aug. 2, 1972, Ser. No. 277,215
Claims priority, application Denmark, Aug. 12, 1971, 3,941/71
Int. Cl. C07c 79/24
U.S. Cl. 260—622 R                                      22 Claims

ABSTRACT OF THE DISCLOSURE p-Nitrophenols, f. inst. p-nitro-phenol and p-nitro-m-cresol, are prepared from the corresponding phenols in two steps. In the first step the phenol is nitrosated in an acidic aqueous medium, for example, in 25% aqueous HCl or $H_2SO_4$, by means of an alkyl nitrite, e.g. methyl nitrite. The resulting p-nitroso-phenol is oxidized to the corresponding p-nitrophenol by means of nitric acid in the presence of an alcohol such as methyl or ethyl alcohol. This oxidation step is preferably carried out in the acidic medium resulting from the nitrosation step, for example, the said HCl or $H_2SO_4$ containing medium, to which nitric acid is added or in which it is formed. The alkyl nitrite formed during the oxidation step is preferably passed to the nitrosation step.

BACKGROUND OF THE INVENTION

This invention relates to the nitration of phenols, and more particularly to the production of mono-nitro phenols having the nitro group in p-position to a hydroxyl group, for example, p-nitro-m-cresol and p-nitro-phenol.

p-Nitrophenols, such as p-nitro-m-cresol and p-nitrophenol, are useful for various purposes, for example, as intermediates for the production of various pesticides such as fenitrothion and parathion.

It is known to prepare p-nitro-phenols from the corresponding phenols by first nitrosating the phenol in an aqueous, acid medium with the aid of nitrous acid, whereupon the p-nitrophenol formed is oxidized with nitric acid into the corresponding p-nitrophenol.

A process of this kind is described, inter alia, in the specification to Danish Pat. No. 119,506 which is based on U.S. patent application Ser. No. 639,283, assigned to Hercules Incorporated, Wilmington, Del., U.S.A. By means of the process dealt with therein, the nitrosation is carried out in an aqueous nitric acid medium with a concentration of nitric acid in the region of from 5 to 30% by weight and at a temperature in the region of from 0 to 10° C. When the phenol has almost completely reacted, a slurry of the p-nitrophenol formed is available in 10–100 times its own weight of the nitric acid medium, the remaining and subsequently formed nitrous acid is decomposed into NO in the nitric acid and NO is separated while the temperature is gradually raised to 15–30° C. In the course of this raising of the temperature, the para-nitrosophenol is oxidized by the nitric acid whereby the nitro compound and nitrous acid are formed. The nitrous acid, due to said increase in temperature, is removed in the form of nitrogen oxides that can be recirculated to the nitrosation step with a view to regenerating the nitrous acid in the nitric acid medium.

It is likewise known, and this also appears from the specification of said Danish patent, that a production of p-nitrophenols by first nitrosating a corresponding phenol with nitrous acid and then oxidizing the nitrosophenol with nitric acid into the corresponding nitro compound, calls for a careful control of all reaction conditions, if undesirable reactions are to be avoided, such as oxidation of the phenol, reactions between nitrosophenol and nitrogen oxides, formation of diazo oxide and reactions between the various substances resulting in tarry products being formed. In order to reduce the chances of phenol, nitrosophenol and nitrous acid having an opportunity of reacting with each other, it is proposed in the specification to said Danish patent that phenol and nitrous acid be brought together gradually and simultaneously in the nitric acid solution in an almost molar ratio. Furthermore, use is made of rapid crystallization of the p-nitrophenol at low temperature gradually as it is being formed, and use is also made of the removal of excess nitrous acid and the nitrogen oxides by evacuation or by blowing through with an inert gas during the last phase of the nitrosation and/or during the oxidation phase.

However, we have now found that the production of said p-nitrophenols, by means of nitrosating a phenol and subsequent oxidation of the nitroso compound formed, can be performed in a different manner so as to obtain considerable advantages, as will be explained in the following.

BRIEF SUMMARY OF THE INVENTION

According to the invention, p-nitrophenols are prepared by a process which comprises nitrosating a phenol, having a nitrosable p-position, in an acidic aqueous medium with a nitrite of the formula RONO, in which R is an alkyl group having 1–6 carbon atoms, and subsequently converting the resulting p-nitrosophenol into the corresponding p-nitro-phenol by oxidizing the p-nitrosophenol by means of nitric acid in the presence of an alcohol of the formula $R^1OH$, in which $R^1$ is an alkyl group having 1–6 carbon atoms, and recovering the resulting p-nitrophenol.

This novel two-step method has the advantage that the reactions may be more easily controlled, so that undesirable side-reactions are more easily avoided, and excellent yields are thereby obtainable. The reactions may be easily controlled so that they do not give rise, or do not give rise to any essential degree, to the formation of inconvenient or obnoxious nitrogeneous gases or other undesirable side-products. The nitrogeneous gases otherwise developed during the oxidation with nitric acid will at least to a considerable degree be "consumed" by the alcohol present during the oxidation, whereby an alkyl nitrite will be formed.

Using phenol as an example of the starting material to be nitrated, the novel two-step process may be illustrated as follows:

First step:

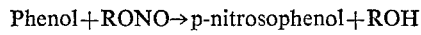

$$Phenol + RONO \rightarrow p\text{-nitrosophenol} + ROH$$

Second step:

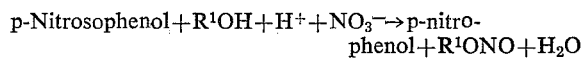

$$p\text{-Nitrosophenol} + R^1OH + H^+ + NO_3^- \rightarrow p\text{-nitrophenol} + R^1ONO + H_2O$$

When R is identical with $R^1$, the overall reaction will be as follows:

Overall reaction:

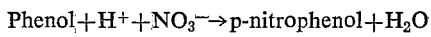

$$Phenol + H^+ + NO_3^- \rightarrow p\text{-nitrophenol} + H_2O$$

From this illustration it will be seen that the reaction medium resulting from the first step may be used directly in the second step, the oxidation step, whereby the alkyl nitrite used in the first step will be re-formed in the second step, and so may be recovered and recycled to the first step. Especially in view thereof, it is easy to perform the process in a continuous or semi-continuous manner.

The invention will now be described in greater detail.

DETAILED DESCRIPTION OF THE INVENTION

The nitrosation step

As said above, the nitrosation is performed in an aqueous acid medium, preferably an aqueous solution of a strong acid, and preferably a strong inorganic acid such as hydrochloric or sulfuric or nitric acid. Of these latter acids, hydrochloric and sulfuric acids are preferred. The concentration of the acid may vary within wide limits, for example, from about 5% by weight up to the highest concentration possible, at least when hydrochloric or sulfuric acid is used. In the case of nitric acid, the concentration will usually be in the range from 5–30% by weight. The selected concentration may to some degree depend on the reaction temperature used. The lower the reaction temperature is, the higher acid concentration can be used without any danger of undesirable side-reactions. During the whole of the nitrosation reaction, the temperature is kept relatively low, preferably between about $-20°$ C. and $+20°$ C., and more preferably between about $0°$ C. and $+10°$ C. At this temperature the acid concentration may conveniently be in the range of 15–30% by weight, for example about 25% by weight. In the case of the use of nitric acid, care should be taken to keep the temperature sufficiently low, for example at about $0°$ C. or lower, in order to avoid the oxidizing effect of the nitric acid on the phenol starting material.

The phenol reactant should be nitrosable (and, therefore, unsubstituted) in the p-position to a hydroxyl group. Preferably, it should not contain any substituents liable to be attacked to any essential degree by the nitrite or any constituent of the reaction medium. Among the phenols which may be nitrosated by the process of the invention may be mentioned, by way of example, phenol as such, m-cresol and o-cresol, xylenols, chlorophenols etc. It is also possible to nitrosate a mixture of phenols, such as a mixture of xylenols.

The phenol to be introsated is usually difficultly soluble in the aqueous acid medium. Nevertheless, it is possible to nitrosate the phenol while in dispersion in the acid medium. Such dispersion can be provided by suitable agitation or homogenisation of the phenol in the acid medium.

However, it is preferable to add to the acid aqueous medium an organic solvent which is a solvent for the phenol, particularly an organic solvent in which the phenol to be nitrosated is soluble, and which is—at least in the first part of the nitrosation reaction—wholly or partly miscible with the acid medium. As examples of such organic solvents may be mentioned diisopropyl ether and other ethers such as dibutyl ether; aliphatic alcohols such as ethyl alcohol, propylalcohol, isopropylalcohol, hexylalcohol, etc.; aliphatic liquid hydrocarbons such as hexane, various petroleum fractions (for example, white spirit, gasoline, etc.); toluene and other aromatic hydrocarbons; acetic acid etc.

The organic solvent used should naturally be one which is inert or substantially inert to the acid and other constituents in the medium. As to the proportion of organic solvent to be added to the medium, it is only necessary to add a proportion sufficient to secure that the phenol is dissolved, but the proportion may vary within wide limits, and may go up to 50% by volume, or even more, for example, up to about 75% by volume of the total reaction medium used. Normally, the proportion of organic solvent used will be in the range from 10–50% by volume of the total reaction medium. Very suitable organic solvents are ethyl alcohol, toluene, xylene, benzene and diisopropyl ether.

The phenol to be nitrosated may be used in the medium in a concentration which may also vary within comparatively wide limits. However, it has been found very suitable to maintain the ratio of phenol to the reaction medium in the range from 0.5–10 moles of phenol per liter of reaction medium. The phenol and alkyl nitrite reactants are preferably added to the acid medium at such rate that in the medium there will be no great excess of any of the reactants, because this will help to suppress undesirable side-reactions. So, for example, an excess of phenol might react with the formed nitroso compound. Furthermore, the reaction is exothermic, so that a too rapid addition of the reactants might make is difficult to maintain the temperature within the desired range, even by effective cooling. The reactants are preferably introduced separately below the surface of the reaction medium, and at the moment of introduction they have preferably a temperature which does not deviate essentially from the desired reaction temperature.

The phenol and nitrite reactant is most conveniently added separately and simultaneously to the acid medium. The proportion of nitrite used is preferably in the range of 1–1.5 mole of nitrite per mole of phenol. It is not necessary to use a single nitrite. If desired the nitrosation can be performed by means of a mixture of nitrites, such as methyl and ethyl nitrite.

Any alkyl nitrite within the definition may be used with good result as the nitrite reactant, for example, methyl nitrite (b.p. $-12°$ C.), ethyl nitrite (b.p. $17°$ C.), isopropyl nitrite (b.p. $45°$ C.), n-propyl nitrite (b.p. $57°$ C.), n-butyl nitrite (b.p. $75°$ C.), amyl nitrite (b.p. $104°$ C.), and hexyl nitrite (b.p. $129–130°$ C.). The alkyl nitrite may contain substituents in the alkyl group such as halogen, preferably chlorine, alkoxy such as methoxy etc. However, it is preferably to use the easy available methyl or ethyl nitrite. $CH_3ONO$ may be introduced into the cold reaction medium in gaseous form. Special advantages of using methyl or ethyl nitrite (or other low boiling nitrites) will be described in the following.

While adding the phenol and alkyl nitrite reactants, the reaction mixture is agitated, and after the addition has been completed the agitation will normally be continued for a certain period, for example 10–60 minutes, if necessary, to be sure of a complete reaction.

The nitrosation reaction, for example the nitrosation of phenol or m-cresol by means of methyl or ethyl nitrite, proceeds very smoothly and results in a very high yield of the p-nitroso compound. So, for example, yields of p-nitrosophenol and p-nitroso-m-cresol of up to 98%, calculated on the phenol, have been obtained.

In a reaction medium as described above, the formed p-nitroso compound will normally be practically insoluble, even when using the afore-mentioned organic solvents. Therefore, it is easy to separate, if so desired, the nitroso compound, for example, by filtration or centrifugation. Such separation will take place, for example, if it is desired to oxidize the nitroso compound in another medium than the one used for nitrosation.

If the reaction medium resulting from the nitrosation step contains a small excess of nitrite, this may be easily removed and recovered, if so desired. In the case of methyl or ethyl nitrite, this may take place, preferably, by evaporations, and in the case of nitrites having a higher boiling point, by distillation, decantation or other procedure known by those skilled in the art.

During the nitrosation reaction on alcohol will be formed. The reaction medium containing this alcohol may be used as such in the following oxidation step, in which case the alcohol may serve as the alcohol indicated in the afore-mentioned reaction scheme, or the alcohol containing reaction medium may be used for another nitrosation step. However, the alcohol may instead thereof be removed, for example, by distillation, and it may then be used for addition in the following oxidation step or it may be used as the organic solvent in another nitrosation step. It is also possible to start nitrosation in a medium containing no organic solvent, and then, after completion of nitrosation, recover the nitroso compound and recycle the alcohol containing medium for use in a further nitrosation step, or to recycle it to the nitrosation step in a continuous nitrosation procedure. Only after several re-uses, it will be necessary to adjust the composition of the medium. However, it is preferred to use the reaction medium, containing the alcohol formed by the nitrosation reaction, in the following oxidation step.

Oxidation step

The oxidation of the nitroso compound formed in the preceding step is performed in the presence of

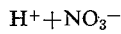

in a suitable concentration. As such oxidation medium may be used a usual aqueous nitric acid, preferably in a concentration of 5 to 30% by weight of $HNO_3$; and preferably the ratio of $HNO_3$ to the nitroso compound to be oxidized is in the range of 1:1.5 mole of $HNO_3$ per mole of nitroso compound.

The oxidation is performed in the presence of, preferably, at least 1 mole of alcohol, $R^1OH$, per mole of nitroso compound. As such alcohol may be used with good results any of the alcohols within the definition, such as methyl alcohol, ethyl alcohol, isopropyl alcohol, n-propyl alcohol, butyl alcohol, amyl alcohol, hexyl alcohol. However, it is preferred to use an alcohol resulting in the formation of a nitrite which can be easily distilled off at the oxidation temperature. For this reason, methyl or ethyl alcohol is preferred, as the resulting methyl or ethyl nitrite is easily evaporable during the oxidation step in which the temperature is kept low, normally in the range between $-10°$ C. and $+25°$ C. The oxidation reaction is an exothermic reaction, and cooling is, therefore, used to maintain the temperature in the desired range. In order to secure removal of the formed methyl or ethyl nitrite, it is sufficient to let oxidation temperature in the latter part of the oxidation procedure increase a few centigrades above the boiling point of the nitrite. Also in the case of nitrites having a boiling point higher than the boiling point of ethyl nitrite, it will normally be easy to remove and recover the nitrite. The formed nitrite is normally insoluble, or only slightly soluble, in the aqueous acid medium and, therefore, will be, so to speak, automatically separated from any constituents in the medium which might react with the nitrite. The nitrite may form a separate phase or may dissolve in the organic solvent mentioned under "nitrosation step." In either case, the nitrite can be easily and quantitatively removed from the oxidation medium, for example, by decantation, possibly followed by distillation. It can then be used for nitrosation of a novel batch of phenol reactant, or it may be in a continuous process be recycled to the nitrosation step. The nitrite is removed far more easy than the water soluble nitrogen oxides which are formed when performing the known process mentioned before. It is not necessary, as in said known process, to blow an inert gas through the medium or to make use of a vacuum in order to remove nitrogen oxides.

It is possible in the oxidation step to use a mixture of alcohols, resulting in the formation of a mixture of alkyl nitrites which, as mentioned above, may also be used in the nitrosation step.

While the alcohol is preferably used in a proportion corresponding to, or slightly above, the proportion corresponding to the nitrosophenol to be oxidized, it is possible to use the alcohol in a somewhat less proportion. However, the proportion of the alcohol should not be essentially less than the equivalent amount, because this will increase the amount of impurities. An equivalent, or practically equivalent, amount of alcohol is present in the reaction medium in which the nitrosation has been performed. Also for this reason, this reaction medium is most advantageously used for the oxidation of the nitroso compound. To this medium containing the nitroso compound and alcohol, the necessary amount of nitric acid is added for oxidation.

Addition of nitric acid, for example a 30 to 40% nitric acid, is preferably performed in a period of from 5 to 180 minutes at a temperature in the lower part of the above mentioned range. During the addition of $HNO_3$ the temperature should preferably not exceed about 10° C., and should preferably be kept lower, for example at about 0° C. During the oxidation with $HNO_3$ the reaction medium is agitated, and after the addition of $HNO_3$ is completed, the agitation is preferably continued for some time, for example, from ½ hour up to 2 hours, and during this period the temperature may be allowed to increase up to about 25° C. or even 25° C. In the case of methyl or ethyl nitrite formed during the oxidation this will result in the distilling off of said nitrite.

It is not necessary to add $HNO_3$ as such to the reaction medium. It may be formed in situ by adding a nitrate, such as an alkali nitrate or earth alkali nitrate to an acidic aqueous medium, for example, a HCl- or $H_2SO_4$- containing medium rsulting from the nitrosation step. The nitrate added is preferably sodium nitrate or calcium nitrate. However, it is preferred to add nitric acid as such to the oxidation medium. This makes the medium better suited for re-use, or more easy to regenerate for reuse, in an oxidation step or in a nitrosation step.

The presence of an organic solvent from the nitrosation step, such as diisopropyl ether or alcohol, is also very advantageous in the oxidation step because it suppresses a tendency for the nitroso compound to be encapsulated in grains of the formed nitro compound which is also normally insoluble or at least difficultly soluble in the reaction medium, when this does not contain organic solvents.

Because of the said solubility properties, the nitro compound, which is crystalline, will normally be easily separable, for example by centrifugation or filtration. After separation it can, if so desired, be further purified by any manner known to those skilled in the art. Such purification may comprise such known treatments as recrystallisation, treatment with active carbon, conversion into a salt, for example, the sodium salt, etc. If the nitro compound is to some degree soluble in the reaction medium (for example, p-nitrophenol may be to some degree soluble in the aqueous acid), the dissolved portion of the nitro compound may be separated by an addition of water.

The obtained yields of nitrophenols are usually very high. By use of the process of the invention for the production of p-nitro-compounds having unoccupied o- and m-positions, it has proved (by investigation of the resulting nitro compounds in thin-layer chromatography) that the nitro compounds do not or only to a very slight degree contain any traces of isomers or dinitro compounds. The yields of the crude, separated and dried p-nitro compounds have been up to 96%, calculated on the starting material, e.g. m-cresol.

After the separation of the nitro compound and the nitrite the medium may, as mentioned, be re-used in an oxidation step or in a nitrosation step. The nitrosation reaction is not acid consuming, and when the medium from the nitrosation is used in the oxidation step, the medium resulting from the oxidation step can, therefore (except when in the nitrosation step use is made of nitric acid which is consumed or at least partly consumed, in the oxidation step) be used in a further nitrosation step without any further measures. Only after a certain number of reuses, it will be necessary to adjust the medium, i.e. due to the water formed in the oxidation step. It will then be necessary to increase the acid concentration. If the acid reaction medium for the nitrosation step is based on nitric acid, it is necessary after use of the medium in the oxidation step to adjust the concentration of acid before re-use. If necessary, the medium resulting from the oxidation step (after separation of nitro compound and nitrite) may be subjected to a distillation procedure to separate excess nitric acid and, at the same time, to increase concentration of the remaining acid. Such distillation procedure is performed in a manner well known to those skilled in the art.

The invention is further illustrated in the following examples.

EXAMPLE 1

250 ml. of 12 N hydrochloric acid and 200 ml. of diisopropyl ether (called hereinafter DIP) were mixed in a triple-necked 1 liter flask fitted with agitator, thermometer, separating funnel with immersion tube, and an immersed gas supply tube. The mixture was cooled to 0° C. and 0.1 mole of m-cresol was added. Following this, 0.9 mole of m-cresol was added through the separating funnel, and concurrently there was through the gas supply tube introduced 0.9 mole of methyl nitrite (90% of the methyl nitrite recovered from a 1 mole oxidation in a previous run). The addition proceeded evenly over 60 minutes at a temperature of 0° C.±2° C. After the termination of the addition, the remaining 0.1 mole of methyl nitrite was added at the same rate as before and agitation was continued for an additional 15 minutes at 0° C. The precipitated p-nitroso-meta-cresol, which is a light-yellowish substance, was filtered off and washed with 200 ml. ice water. The substance was dried in an oven at 40° C., and the yield, after this, was 93%, calculated on the cresol.

The resulting reaction medium may be reused for a further nitrosation step. The dried p-nitroso-m-cresol was poured into a sealed, triple-necked flask fitted with agitator, thermometer and a reflux cooler which, at its top, is provided with a gas outlet to a vacuum pump, via a cold finger with $CO_2$+acetone and via a manostate. In addition, 250 ml. of 12 N hydrochloric acid+400 ml. of DIP+1.1 mole of methyl alcohol were poured into the flask. The mixture was cooled to 0° C. and 1.05 mole of sodium nitrate dissolved in water was added. The system was closed, and the pressure adjusted so that the boiling point of the DIP became 20° C. Oxidation was now proceeded with for 2 hours at 20° C. After the termination of the oxidation process, there was in the cold finger collected approximately 50 ml. DIP+1 mole methyl nitrite which may be used to nitrosate 1 mole of cresol, as mentioned in the foregoing. The receiving vessel in the cold finger was changed, the cooling in the reflux cooler was switched off, and the pressure was lowered that much that all the DIP boiled off the reaction flask, without the temperature of its contents rising to above 25° C. The precipitated p-nitro-m-cresol was filtered off, washed and dried. The total yield of p-nitro-m-cresol was 89%, calculated on cresol.

EXAMPLE 2

200 ml. of 12 N hydrochloric acid and 200 ml. of ethyl alcohol were mixed in a triple-neckel 1 liter flask fitted with agitator, thermometer, two separating funnels with immersion tube, and a cold finger on the gas outlet. The mixture was cooled to 0° C. 1 mole of m-cresol and 1.2 mole of ethyl nitrite were concurrently added dropwise through the two separating funnels while agitating and while the temperature was kept at 0±2° C. Agitation was continued for a further 30 minutes after the addition was terminated. In the course of 45 minutes, and at a temperature below 10° C., a solution of 95 g.=1.12 mole of sodium nitrate in 110 ml. water was now added dropwise to the slurry of p-nitroso-m-cresol. The temperature was maintained at 10° C. for about one hour, after which it was raised to 20–25° C., at which it was maintained for an additional 2 hours. During this oxidation, 84 ml. ethyl nitrite were collected in the cold finger, which nitrite may be used in a further nitrosation step. The oxidation mixture was cooled to 0° C., and the precipitated p-nitro-m-cresol was filtered off, washed with ice water and dried. The yield was 94.4%, calculated on the cresol. The dried product was dissolved in a mixture of 500 ml. water and 52 g. NaOH. The resulting mixture was heated to 90° C., and 120 g. sodium chloride were added and when this was dissolved, the mixture was cooled to 0° C. The salted-out sodium salt of p-nitrometacresol was filtered off and washed with 100 ml. of cold aqueous sodium chloride solution. The sodium salt was dissolved in 100 ml. of water and acidified with 12 N hydrochloric acid to pH 6.5. The precipitated p-nitro-metacresol was filtered off and dried. The dried p-nitrometacresol was a light-brownish substance which, when examined by means of thin-layer chromatography, did not show any content of ortho- or di-nitro compounds. Analysis: $TiCl_3$ titration: 99.0% p-nitrometacresol.

Colorimetric determination of Na salt: 98.9% p-nitrometacresol.

Total Yield: 90%, calculated on the cresol.

Melting Point: 128.9° C.

EXAMPLE 3

Like Example 2, apart from the fact that instead of a sodium nitrate solution, a mixture of 90 ml. of 67% nitric acid+90 ml. water was employed. The period for adding this was 15 minutes. 95 ml. ethyl nitrite were regenerated during the oxidation. Without purifying, the yield of p-nitrometacresol amounted to 95.3% of the theoretical one, calculated on cresol. The analysis showed a purity of 99.7% by $TiCl_3$ titration and 99.3% by colorimetric analysis.

The remaining medium and the regenerated nitrite was used in a further run of the process, with similar result.

In another embodiment, the process was performed in the same manner, except that instead of ethylnitrite an equimolar amount of methylnitrite was used. The medium from the nitrosation step, containing methylalcohol as well as ethylalcohol, resulted, when used in the oxidation step, in the formation of a mixture of methyl and ethyl nitrite. p-Nitro-m-cresol was obtained in similar yield as before. The mixture of nitrites, and the remaining medium were used with similar results in a further run of the process.

EXAMPLE 4

Like the first two paragraphs of Example 3, only with the difference that 20 ml. ethyl alcohol were replaced by water. 100 ml. ethyl nitrite were regenerated, and the total yield of unrefined p-nitrometacresol constituted 95.1%, calculated on the cresol.

EXAMPLE 5

Like the first two paragraphs of Example 3, with the difference that only 100 ml. hydrochloric acid were used. 84 ml. ethyl nitrite were regenerated, and the total yield of unrefined p-nitrometacresol was 95.1%, calculated on the cresol.

EXAMPLE 6

In a battery consisting of five 1 liter back-mix reactors the process was carried out continuously according to prescription analogous to the one described in Example 4. All supplies were fed via immersion tubes, and the following constituents were charged per hour while maintaining the temperatures as stated below.

| Step No. | Charging per hour | Temperatures in ° C. |
|---|---|---|
| 1 | 1 mole of m-cresol, 200 ml. 12 N HCl, (180 ml. EtOH), 20 ml. $H_2O$, 90 ml.=1.07 mole $C_2H_5$-ONO. | 0±2 |
| 2 | | 0±2 |
| 3 | 180 ml. (33%) $HNO_3$ | 5–10 |
| 4 | | 25 |
| 5 | 300 ml. ice water | 0 |

The p-nitrometacresol filtered off from the material discharged from step No. 5 was dried and weighed and the yield—calculated over 100 hours of operation—was 89%, calculated on the cresol. The ethyl nitrite used in step No. 1 was quantitatively regenerated from step No. 4. The analysis showed that the content of free m-cresol in step No. 2 was approximately 0.1% and that the content of free p-nitrosometacresol in step No. 3 was approximately 0.4%.

EXAMPLE 7

While using an apparatus like the one dealt with in Example 2, 400 ml. of 12 N hydrochloric acid+400 ml. of DIP were poured into the flask. Through the separating funnels, 1.2 mole of ethyl nitrite and a quantity of a mixture of m- and p-cresol corresponding to 1 mole of m-cresol was added concurrently in the course of 2 hours. The content of m-cresol in the mixture may vary between 25% and approximately 100%. The reaction proceeds just like when a m-cresol is employed because, as is known, p-cresol is not nitrosated but occurs dissolved in the DIP phase after the reaction is terminated. The crystallized p-nitrometacresol was filtered off on a Büchner funnel and was washed with cold DIP and thereafter with ice water. The mother liquor and the washing liquids were mixed, and the DIP phase was separated by decantation. By distilling off the DIP, approximately 85–90% of the p-cresol present in the original mixture was recovered in pure form.

The filtered-off p-nitrosometacresol was poured back into the reaction flask and was oxidized with nitric acid in the presence of ethyl alcohol in the manner indicated in Example 3. The ethyl nitrite used for the nitrosation was regenerated quantitatively, and the yield of p-nitrometacresol constituted 90%, calculated on the content of m-cresol in the starting material. A titration analysis and thin-layer chromatography showed that the quality was the same as when pure m-cresol is used.

EXAMPLE 8

400 ml. of 12 N hydrochloric acid, 400 ml. water and 35 ml. acetic acid were mixed in a 1 liter triple-necked flask fitted with agitator, thermometer and two separating funnels.

The mixture was cooled to a temperature of $-1°$ C.$\pm 1°$ C., and 1.0 mole of phenol and 95 ml. of ethyl nitrite were added concurrently over a period of 1½ hours at the said temperature. After-reaction was performed for half an hour at the same temperature.

Subsequent to the nitrosation mixture having been transferred to a 2 liter flask (similar to the 1 liter flask used in Example 2), 60 ml. ethyl alcohol and 90 ml. concentrated nitric acid were added in the course of about ten minutes. Following this, the temperature was maintained at 6–8° C. for half an hour and was thereupon allowed to rise to 18–20° C., at which it was maintained for a period of 1½ hours. After cooling and filtering off, the yield of crude p-nitrophenol was approximately 96.5%. After purification via the sodium salt (as indicated in Example 2), the yield was approximately 87.5%.

EXAMPLE 9

400 ml. of 12 N hydrochloric acid, 400 ml. of water and 30 ml. of ethyl alcohol were mixed in a triple-necked 1 liter flask fitted with agitator, thermometer and two separating funnels. The mixture was cooled to a temperature of 0° C.$\pm 2°$ C., and 1.0 mole of phenol and 95 ml. ethyl nitrite were concurrently added over a period of 2½ hours at the said temperature.

After-reaction was carried out for 1 hour at the same temperature. After this, 90 ml. of concentrated nitric acid were added to the nitrosation mixture over a period of about 10 minutes, and the temperature was allowed to rise to 17–19° C., at which it was maintained for 2½ hours. Subsequent to cooling and filtering off the yield of crude p-nitro-phenol was approximately 96.0%.

What we claim is:

1. A process for the production of p-nitrophenols which comprises
   (a) mixing (1) a nitrite of the formula R.O.NO, in which R is an alkyl group having 1–6 carbon atoms with (2) phenols selected from the group consisting essentially of phenol, m-cresol and a mixture of m- and p-cresol in an acidic aqueous medium which is an aqueous solution of a strong acid at temperatures ranging from $-20°$ to 20° C. to form a precursor p-nitrosophenol; and
   (b) treating the p-nitrosophenol with nitric acid in the presence of an alcohol of the formula $R^1OH$, in which $R^1$ is an alkyl group having 1–6 carbon atoms, at temperatures ranging from about $-10°$ to 25° C.; and
   (c) recovering a p-nitro-phenol.

2. A process as claimed in claim 1, in which the alcohol is present in the oxidation step in at least the equimolar proportion in relation to the p-nitroso-phenol.

3. A process as claimed in claim 1, in which the alcohol, $R^1OH$, is one wherein $R^1$ is identical with R in the nitrite, R.O.NO.

4. A process as claimed in claim 3, in which the oxidation with nitric acid is carried out in the medium wherein the nitrosation has been carried out and which contains the alcohol formed by the nitrosation reaction.

5. A process as claimed in claim 1, wherein the alcohol, $R^1OH$, is one producing in the oxidation step a nitrite, $R^1ONO$, having a boiling point sufficiently low to allow the nitrite to distill off during the oxidation step.

6. A process as claimed in claim 5, in which the alcohol is methyl or ethyl alcohol.

7. A process as claimed in claim 1, in which the phenol to be nitrosated is selected from the group consisting of phenol and m-cresol.

8. A process as claimed in claim 1, wherein the nitrosation is performed by using a mixture of nitrites of formula R.O.NO, and the oxidation is performed in the presence of a mixture of alcohols of formula $R^1OH$.

9. A process as claimed in claim 1, wherein step (a) is performed in an acidic aqueous medium which medium further contains an organic solvent said solvent inert to the acid and other constituents in said medium, in which the phenol to be nitrosated is soluble, and which is at least partly miscible with the acidic aqueous medium.

10. A process as claimed in claim 9, in which the organic solvent is selected from the group of solvents consisting of dialkyl ethers, aliphatic alcohols, aliphatic and aromatic hydrocarbons, and lower aliphatic carboxylic acids.

11. A process as claimed in claim 10, in which the organic solvent is selected from the group consisting of diisopropyl ether, ethylalcohol, xylene, benzene, toluene and acetic acid.

12. A process as claimed in claim 1, in which the acidic aqueous medium for the nitrosation step is used in a proportion of 100–2000 ml. per mole of phenol to be nitrosated, the acid concentration being at least 5% by weight based on the total aqueous phase of the medium.

13. A process as claimed in claim 1, in which the nitrite is used in a proportion of 1–1.5 mole per mole of phenol to be nitrosated.

14. A process as claimed in claim 1, in which in the oxidation step, nitric acid is used in the reaction medium in a proporton of 1–1.5 mole of $HNO_3$ per mole of nitroso compound to be oxidized.

15. A process as claimed in claim 1, in which the nitrite formed in the oxidation step is recovered and used in a nitrosation step.

16. A process as claimed in claim 9, wherein the acidic aqueous medium used in the nitrosation step is an aqueous mixture of a mineral acid, selected from the group consisting of hydrochloric acid and sulfuric acid, and the organic solvent.

17. A process as claimed in claim 9, in which the aqueous medium resulting from the nitrosation step is used for performing the oxidation step by adding nitric acid, and the aqueous medium remaining after recovering of the nitrophenol and the formed nitrite, is used, together with said nitrite, in a further nitrosation step.

18. A process for the production of p-nitro-phenols which comprises nitrosating a phenol, having a nitrosable p-position, by means of a nitrite selected from the group consisting of methyl and ethyl nitrite, the nitrosation being performed in an acidic aqueous medium containing an organic solvent in which the phenol to be nitrosated is soluble, and which is at least partly miscible with the acidic aqueous medium, oxidizing the p-nitroso-phenol to the corresponding p-nitro-phenol by means of nitric acid in the presence of an alcohol selected from the group consisting of methyl and ethyl alcohol, controlling the temperature during the oxidation step to secure that the nitrite formed in the oxidation reaction is distilled off, and recovering the nitrite and the resulting p-nitrophenol.

19. A process as claim in claim 18, in which the oxidation step is performed in an acidic aqueous medium similar to the one used in the nitrosation step.

20. A process for the production of p-nitro-phenols selected from the group consisting of p-nitro-phenol and p-nitro-m-cresol which comprises (a) nitrosating a phenol selected from the group consisting of phenol and m-cresol by means of a nitrite, selected from the group consisting of methyl and ethyl nitrite, in an aqueous medium containing at least 5% by weight of a mineral acid, selected from the group consisting of hydrochloric acid and sulfuric acid, and containing an organic solvent for the phenol, said solvent being at least partly miscible with the aqueous medium, the phenol being used in a proportion of 0.5–10 moles per liter medium, the nitrite being used in a proportion of 1–1.5 moles per mole of phenol, and the temperature during the nitrosation being maintained between −20° C. and +20° C., (b) oxidizing the resulting nitroso compound in a similar medium which contains the alcohol formed during the nitrosation step in at least equimolar proportion in relation to the nitroso compound, the oxidation being performed by means of nitric acid in a concentration of from 5–30%, while maintaining the temperature between −10° C. and +25° C., and distilling off the formed nitrite by a temperature above the boiling point of the nitrite, and (c) recovering the resulting p-nitro-compound.

21. The process of claim 1, in which the phenol to be nitrosated is selected from the group consisting essentially of phenol, m-cresol, o-cresol, xylenols and chlorophenols.

22. The process of claim 1, in which a mixture of m-cresol and p-cresol is used for the nitrosation step.

References Cited

UNITED STATES PATENTS

| | | | |
|---|---|---|---|
| 2,301,912 | 11/1942 | Jones | 260—622 |
| 3,285,972 | 11/1966 | Young | 260—621 |
| 3,320,324 | 5/1967 | Kauba | 260—621 |
| 3,510,527 | 5/1970 | Prosser | 260—622 |

FOREIGN PATENTS

| | | | |
|---|---|---|---|
| 1,165,637 | 10/1969 | Great Britain | 260—622 |

BERNARD HELFIN, Primary Examiner

W. B. LONE, Assistant Examiner

U.S. Cl. X.R.

260—621 N